(12) United States Patent
Iwamoto (10) Patent No.: US 10,437,533 B2
(45) Date of Patent: Oct. 8, 2019

(54) PRINT SYSTEM, PRINTER DRIVER, AND PROGRAM

(71) Applicant: TOSHIBA TEC KABUSHIKI KAISHA, Tokyo (JP)

(72) Inventor: Jun Iwamoto, Sunto Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 115 days.

(21) Appl. No.: 15/616,210

(22) Filed: Jun. 7, 2017

(65) Prior Publication Data

US 2017/0364313 A1 Dec. 21, 2017

(30) Foreign Application Priority Data

Jun. 16, 2016 (JP) .................................. 2016-120109

(51) Int. Cl.
*G06F 19/00* (2018.01)
*G06F 3/12* (2006.01)
*G06F 3/02* (2006.01)

(52) U.S. Cl.
CPC .......... *G06F 3/1232* (2013.01); *G06F 3/0227* (2013.01); *G06F 3/1203* (2013.01); *G06F 3/1204* (2013.01); *G06F 3/1229* (2013.01); *G06F 3/1234* (2013.01); *G06F 3/1284* (2013.01); *G06F 3/1231* (2013.01)

(58) Field of Classification Search
CPC ...... H04W 12/06; H04W 12/08; G06F 3/1292
USPC ................................. 702/184, 182, 183, 185
See application file for complete search history.

(56) References Cited

U.S. PATENT DOCUMENTS

| | | | |
|---|---|---|---|
| 6,702,488 B1 | 3/2004 | Hooper et al. | |
| 2006/0069824 A1 | 3/2006 | Hodder | |
| 2009/0231367 A1* | 9/2009 | Tsuchiya | B41J 2/16517 347/7 |
| 2012/0075664 A1* | 3/2012 | Nichols | G06F 3/1204 358/1.15 |

FOREIGN PATENT DOCUMENTS

JP 2002-092745 3/2002

OTHER PUBLICATIONS

Extended European Search Report dated Dec. 7, 2017 in corresponding European Patent Application No. 17176303.0 (Publication No. EP 3267306 A1), 8 pages.

* cited by examiner

*Primary Examiner* — Edward Raymond
(74) *Attorney, Agent, or Firm* — Kim & Stewart LLP (57) ABSTRACT

A printing apparatus includes a printer having a first processor and a printing unit. A registration device is connected to the printer. The registration device includes a second processor and has a printer driver. The printer stores a control program that when executed by the first processor causes the printer to request the printer driver to cause the printer to request first maintenance information of the registration device from the printer driver. The printer, under control of the control program, acquires second maintenance information, which represents maintenance information of the printer, and outputs at least one of the first and second maintenance information.

18 Claims, 5 Drawing Sheets

PRINT SYSTEM, PRINTER DRIVER, AND PROGRAM

This application is based upon and claims the benefit of priority from Japanese Patent Application No. 2016-120109, filed Jun. 16, 2016, the entire contents of which are incorporated herein by reference.

FIELD

Embodiments described herein relate generally to a print system, a printer driver, and a program.

BACKGROUND

A printer with a maintenance mode is known. In a maintenance mode, this type of printer may have a function of printing out maintenance information of the printer.

In addition, an apparatus other than a printer connected to the printer may have a function of generating an image representing maintenance information of the apparatus and making the printer print the image.

According to the function, a maintenance worker or the like can obtain a printed material representing maintenance information of a printer and an apparatus connected to the printer. However, in order to obtain the printed material representing the maintenance information of the printer and the apparatus connected to the printer, the maintenance worker or the like has to operate each of the printer and the apparatus.

Under such circumstances, a print system, a printer driver, and a program which can easily print maintenance information of a printer and an apparatus other than the printer, are required.

DETAILED DESCRIPTION

In general, according to one embodiment, a printing apparatus comprises a printer including a first processor and a printing unit that is capable of printing on a print medium. The printing apparatus also comprises a registration device connected to the printer. The registration device includes a second processor and a printer driver. The printer stores a control program that when executed by the first processor causes the printer to request the printer driver to cause the printer to a request unit that is included in the printer and requests the printer driver to cause acquisition of for first maintenance information by the registration device and then transmit the first maintenance information from the registration device to the printer, which represents maintenance information of the registration device, the printer to collect second maintenance information, the second maintenance information being which represents maintenance information of the printer, and the printer to output at least one of the first and second maintenance information.

Hereinafter, a specific embodiment will be described with reference to the drawings, using an example of an accounting system into which a print system is incorporated. This example is used for the purposes of illustrations only. Accordingly, the scope of the invention should not be considered limited to those specific applications.

Figure 1:
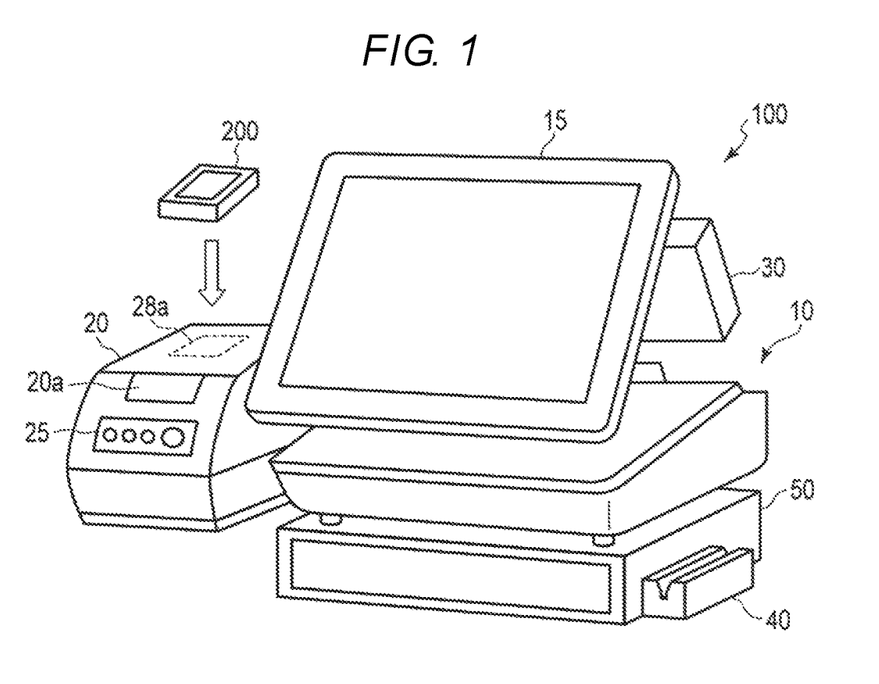
FIG. 1 is a perspective view illustrating a configuration of an accounting system according to an embodiment.

FIG. 1 is a perspective view illustrating a configuration of an accounting system 100.

The accounting system 100 includes a registration device 10, a touch panel 15, a receipt printer 20, a customer display 30, a magnetic card reader 40, and a drawer 50.

The registration device 10 registers content of transaction that a customer performs (hereinafter, referred to as "target of registration"). The transaction is typically sales of merchandise. A point-of-sale (POS) terminal or an electronic cash register is typically used as the registration device 10. The registration device 10 requests printing of a receipt representing the content of transaction to the receipt printer 20.

The receipt printer 20 prints a paper receipt according to the request from the registration device 10 or wirelessly transmits an electronic sheet data to an information terminal 200. Alternatively, the receipt printer 20 has a maintenance mode as one of its possible operation modes. In the maintenance mode, the receipt printer 20 prints a maintenance sheet listing maintenance information, or wirelessly transmits maintenance data including the maintenance information to an information terminal 200. The receipt printer 20 includes an outlet 20a, an operation panel 25, and antenna 28a, which will be described below. The information terminal 200 accepts, manages, and displays the electronic sheet data and maintenance information that the receipt printer 20 wirelessly transmits. The information terminal 200 is typically a mobile device (e.g., a laptop computer, a smart phone, a tablet computer, or other mobile device). However, the information terminal 200 may be any other type of computing device.

The customer display 30 is provided toward a side (rear side of FIG. 1) at which the customer is located. The customer display 30 displays information to the customer according to instruction from the registration device 10. A conventional display device such as a fluorescent tube display or a liquid crystal display can be used as the customer display 30.

The magnetic card reader 40 reads information magnetically recorded in a magnetic card. The magnetic card reader 40 outputs the information to the registration device 10.

The drawer 50 stores money or the like in an internal storage tray. The drawer 50 opens the storage tray according to the instruction from the registration device 10 such that the money can be stored and withdrawn.

Figure 2:
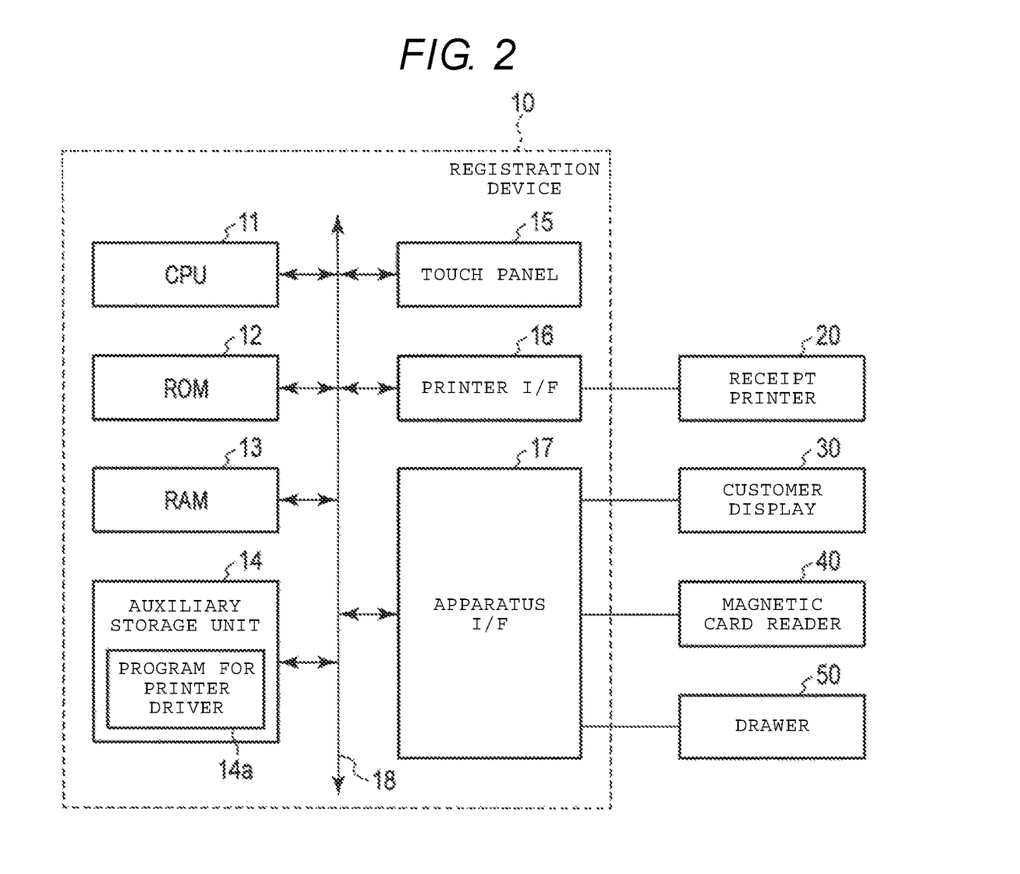
FIG. 2 is a block diagram illustrating a schematic circuit configuration of a registration device.

FIG. 2 is a block diagram illustrating a circuit configuration of registration device 10.

The registration device 10 includes a central processing unit (CPU) 11, a read-only memory (ROM) 12, a random-access memory (RAM) 13, an auxiliary storage unit 14, a touch panel 15, a printer interface (printer I/F) 16, and an apparatus interface (apparatus I/F) 17, and a bus 18.

In the registration device 10, the CPU 11, the ROM 12, the RAM 13, and the auxiliary storage unit 14 are connected to each other through the bus 18, thereby, configuring a computer which controls the registration device 10.

The CPU 11 corresponds to a central processor unit of the computer. The CPU 11 controls each element of the registration device 10 so as to realize various operations of the registration device 10, based on an operating system, middleware, and an application program which can be stored in the ROM 12 and the RAM 13.

ROM 12 stores the operating system. There is also a case where the ROM 12 stores the middleware or the application program. In addition, there is also a case where the ROM 12 stores data which is referred to when the CPU 11 performs various types of processing.

RAM 13 stores data which is referred to when the CPU 11 performs various types of processing. Furthermore, the RAM 13 stores data which is temporarily used when the CPU 11 performs various types of processing, and is used as a so-called work area. A part of a storage area of the RAM 13 is used as a merchandise list area for managing information on merchandise whose sales registration is to be performed.

The auxiliary storage unit 14 corresponds to an auxiliary storage unit of the computer. For example, an electrically erasable programmable read-only memory (EEPROM), a hard disk drive, a solid state drive (SSD), or the like can be used as the auxiliary storage unit 14. The auxiliary storage unit 14 stores data which is used when the CPU 11 performs various types of processing or data which is generated by processing of the CPU 11. There is also a case where the auxiliary storage unit 14 stores programs such as the middleware and the application program. A program which can be stored in the auxiliary storage unit 14 includes a printer driver program 14*a*. Instructions for the CPU 11 to operate receipt printer 20 are stored in the printer driver program 14*a*. In general, the registration device 10 may be transferred to an end user without the printer driver program 14*a* being stored in the auxiliary storage unit 14. The printer driver program 14*a* may be stored in a removable storage medium and separately transferred to the end user, or transferred via a network. Subsequent to the transfers of the registration device 10 and the printer driver program 14*a*, the user or the like may store the printer driver program 14*a* in the auxiliary storage unit 14 of the registration device 10. In one or more embodiments, a magnetic disk, a magneto-optical disk, an optical disk, a semiconductor memory, or the like can be used as the removable storage medium. However, the registration device 10 may also be transferred to the end user with the printer driver program 14*a* stored in the ROM 12 or the auxiliary storage unit 14.

The touch panel 15 functions as an input device of the registration device 10 for an operator to input data and a display device for displaying information on the operator. The touch panel 15 may be located toward a side (front side of FIG. 1) where the operator is located. The touch panel 15 may be located on an upper side of the registration device 10, for example, as illustrated in FIG. 1.

The printer interface 16 permits data communication between the CPU 11 and the receipt printer 20. A conventional device based on an interface standard, such as universal serial bus (USB), can be used as the printer interface 16.

The apparatus interface 17 is connected to various apparatuses which are externally attached to the registration device 10, other than the receipt printer 20 (hereinafter, referred to as "external apparatus"). In the present embodiment, the customer display 30, the magnetic card reader 40, and the drawer 50 are connected to the apparatus interface 17, and thus, those correspond to the external apparatuses. However, in one or more embodiments, at least a part or all of the customer display 30, the magnetic card reader 40, and the drawer 50 may not be connected to the apparatus interface 17. In addition, the apparatus interface 17 may be connected to other apparatuses, such as an automatic change machine, a non-contact type integrated chip (IC) card reader, a touch panel, or a bar code reader. That is, types of connected external apparatuses depend on the intended operational form of the registration device 10. In one or more embodiments, external apparatuses may not be present or attached depending on the operational form of the registration device 10. The apparatus interface 17 permits data communication between the connected apparatus and the CPU 11. A conventional device based on an interface standard, such as USB or RS-232C, can be used as the apparatus interface 17.

The bus 18 connects the CPU 11, the ROM 12, the RAM 13, the auxiliary storage unit 14, the touch panel 15, the printer interface 16, and the apparatus interface 17 to each other.

Figure 3:
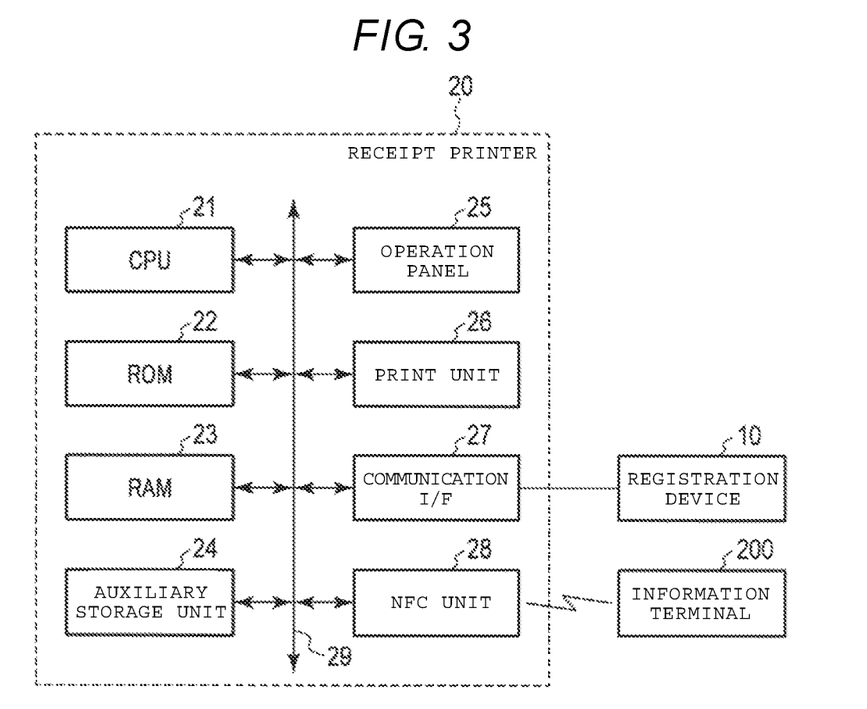
FIG. 3 is a block diagram illustrating a circuit configuration of a receipt printer.

FIG. 3 is a block diagram illustrating a circuit configuration of the receipt printer 20.

The receipt printer 20 includes a CPU 21, a ROM 22, a RAM 23, an auxiliary storage unit 24, an operation panel 25, a print unit 26, a communication interface (communication I/F) 27, a near field communication (NFC) unit 28, and a bus 29.

In the receipt printer 20, the CPU 21, the ROM 22, the RAM 23, and the auxiliary storage unit 24 are connected to each other through the bus 29, thereby, configuring a computer which controls the receipt printer 20.

The CPU 21 corresponds to a central processing unit of the computer. The CPU 21 controls each element of the receipt printer 20 so as to realize various operations of the receipt printer 20, based on an operating system, middleware, and an application program which are stored in ROM 22 and RAM 23.

ROM 22 stores the operating system. There is also a case where the ROM 22 stores the middleware and the application program. In addition, there is also a case where the ROM 22 stores data which is referred to when the CPU 21 performs various types of processing.

RAM 23 stores data which is referred to when the CPU 21 performs various types of processing. Furthermore, the RAM 23 stores data which is temporarily used when the CPU 21 performs various types of processing, and is used as a so-called work area.

The auxiliary storage unit 24 corresponds to an auxiliary storage unit of the computer. For example, an EEPROM, a hard disk drive, an SSD, or the like can be used as the auxiliary storage unit 24. The auxiliary storage unit 24 stores data which is used when the CPU 21 performs various types of processing or data which is generated by processing of the CPU 21. There is also a case where the auxiliary storage unit 24 stores the middleware or the application program. In one or more embodiments, the auxiliary storage unit 24 may not be included in the receipt printer 20.

The programs which are stored in the ROM 22 or the auxiliary storage unit 24 include a control program described in control processing, which will be described below. In general, the receipt printer 20 may be transferred to an end user with the control program stored in the ROM 22 or the auxiliary storage unit 24. However, the receipt printer 20 maybe transferred to the end user without the control program stored in the ROM 22 or the auxiliary storage unit 24. In this case, the control program may be stored in a removable storage medium and separately transferred to the end user, or transferred via a network. Subsequent to the transfers of the receipt printer 20 and the control program, the end user or the like may store the control program in the auxiliary storage unit 24 of the receipt printer 20. In one or more embodiments, a magnetic disk, a magneto-optical disk, an optical disk, a semiconductor memory, or the like can be used as the removable storage medium.

The operation panel 25 is included on a front surface of the receipt printer 20, for example, as illustrated in FIG. 1. The operation panel 25 includes operation buttons for operating the receipt printer 20, and a display device for displaying an operation mode of the receipt printer 20.

The print unit 26 prints an arbitrary image on receipt paper (a print medium). The print unit 26 may have a conventional printer configuration, including a print head of a thermal printer and a transport mechanism which is configured to transport the receipt paper for printing. The print unit 26 prints an image representing content of transaction on the receipt paper (i.e., receipt) and discharges out of the receipt printer 20 from the outlet 20a illustrated in FIG. 1. A print head of any other types of printers, such as a dot impact printer or an ink jet printer may be used for the print head of the print unit 26. The print unit 26 corresponds to a printing mechanism which prints an image, inclusive of a text image, on the receipt paper that is an example of a print medium.

The communication interface 27 allows data communication between the registration device 10 and the CPU 21. A conventional device based on an interface standard such as USB or RS-232C can be used as the communication interface 27.

The NFC unit 28 includes an antenna 28a disposed to face an upper surface of the receipt printer 20, as illustrated in FIG. 1. The NFC unit 28 performs wireless communication with the information terminal 200 close to the antenna 28a by using an NFC communication method.

The bus 29 connects the CPU 21, the ROM 22, the RAM 23, the auxiliary storage unit 24, the operation panel 25, the print unit 26, the communication interface 27, and the NFC unit 28 to each other.

Next, an operation of the accounting system 100 configured as described above will be described below, using an example of contents of certain types of processing. Contents of other types of processing may be used without departing from the scope of the invention.

In the accounting system 100, an operation relating to accounting for a transaction is performed. Registration device 10 provides, for example, registration processing relating to transactions. If the transaction involves payment, the accounting system 100 further performs payment processing. For example, if the transaction is sales of merchandise, the registration device 10 performs registration of merchandise being sold and generates a list of the sold merchandise for each transaction. After the registration is completed, the registration device 10 performs processing for paying a payment amount relating to the merchandise included in the list. Hereinafter, description will be made by assuming that the transaction to be registered as registration target is a sale of merchandise between a merchandising store and a customer.

The customer display 30 displays an image representing information to the customer in accordance with instruction from the registration device 10 when registration processing or payment processing is performed. If card information for the payment processing is required, the magnetic card reader 40 reads the card information recorded in a magnetic card, controlled by an operator, and outputs the card information to the registration device 10. The drawer 50 opens in accordance with the instruction from the registration device 10 if withdrawal/storage of money relating to the payment processing is required.

If the payment has been completed, the registration device 10 transmits receipt data including transaction details and also requests (sends a print request to) the receipt printer 20 to print a receipt. The print request is performed by the CPU 11 of the registration device 10 executing a printer driver program 14a.

The communication interface 27 of the receipt printer 20 receives the print request. Then, the CPU 21 instructs the print unit 26 to print a paper receipt if a predetermined standby time has expired without performing any NFC communication with the information terminal 200 or if a print instruction is given by a predetermined button operation or the like on the operation panel 25. That is, the CPU 21 controls the print unit 26 such that a transaction receipt is printed on a print medium according to the receipt data received by the communication interface 27. However, if NFC communication with the information terminal 200 can be established prior to the expiration of the predetermined standby time or the print instruction being given, then CPU 21 performs wireless transmission of electronic receipt data to the information terminal 200. That is, the CPU 21 generates the electronic receipt data based on the receipt data received by the communication interface 27, and wirelessly transmits the electronic receipt data via the near field communication unit 28 to the information terminal 200.

Thus, when the receipt printer 20 is in a standby mode or the like, if an operation such as long pressing of a button on the operation panel 25 is performed, the CPU 21 switches the receipt printer 20 from the standby mode to a maintenance mode. In the maintenance mode, CPU 21 performs control processing based on a control program stored in ROM 22 or auxiliary storage unit 24.

Figure 4:
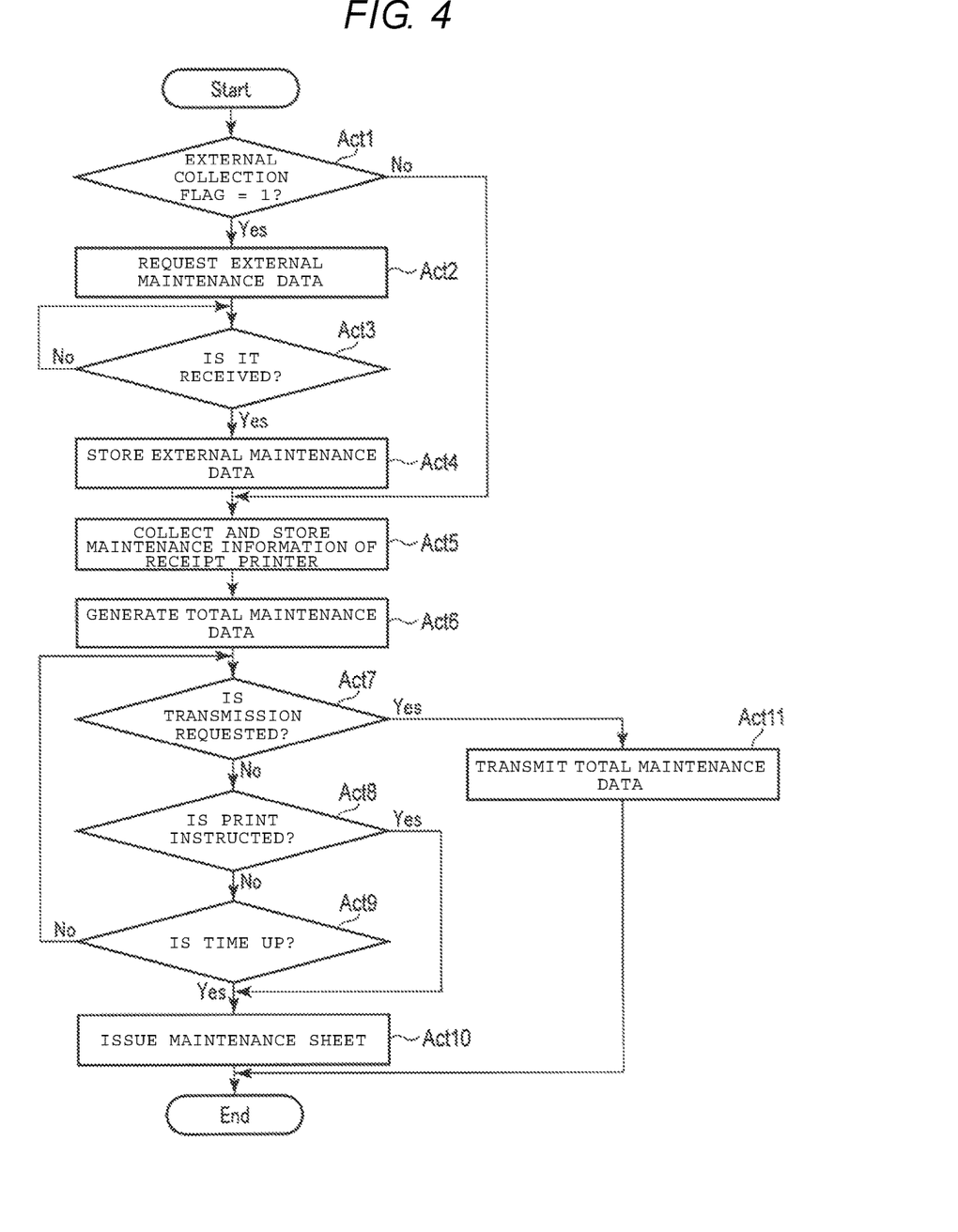
FIG. 4 is a flowchart of control processing which is performed by a central processor unit (CPU).

FIG. 4 is a flowchart of a control processing which can be performed by the CPU 21.

In Act 1, the CPU 21 determines whether or not an external collection flag stored in the auxiliary storage unit 24 is set to "1". The external collection flag represents whether or not maintenance data of apparatuses other than the receipt printer 20 will be collected, and a state "1" represents the maintenance data of the apparatuses other than the receipt printer 20 will be collected. The CPU 21 sets the external collection flag to "0" or "1", according to a predetermined operation, such as a button operation or the like on the operation panel 25. Either "0" or "1" may be a default value for the external collection flag. Here, when the external collection flag is set to "1", the CPU 21 determines that an answer is Yes and proceeds to Act 2.

In Act 2, the CPU 21 requests the registration device 10 to transmit external maintenance data. Specifically, the CPU 21 transmits a command from the communication interface 27 to the registration device 10 to request the external maintenance data. As the command is received by the printer interface 16 of the registration device 10, the request is accepted by the registration device 10. Subsequently, the CPU 11 of the registration device 10 starts collection processing, which will be described below, according to the printer driver program 14a. Thus, the collection processing is performed by a printer driver as the CPU 11 executes the printer driver program 14a. That is, the printer driver program 14a starts the collection processing after receiving the request. Hence, as the CPU 21 performs the control processing based on the control program, a computer, which comprises the CPU 21, functions as a request unit which requests the printer driver to transmit the maintenance information.

Figure 5:
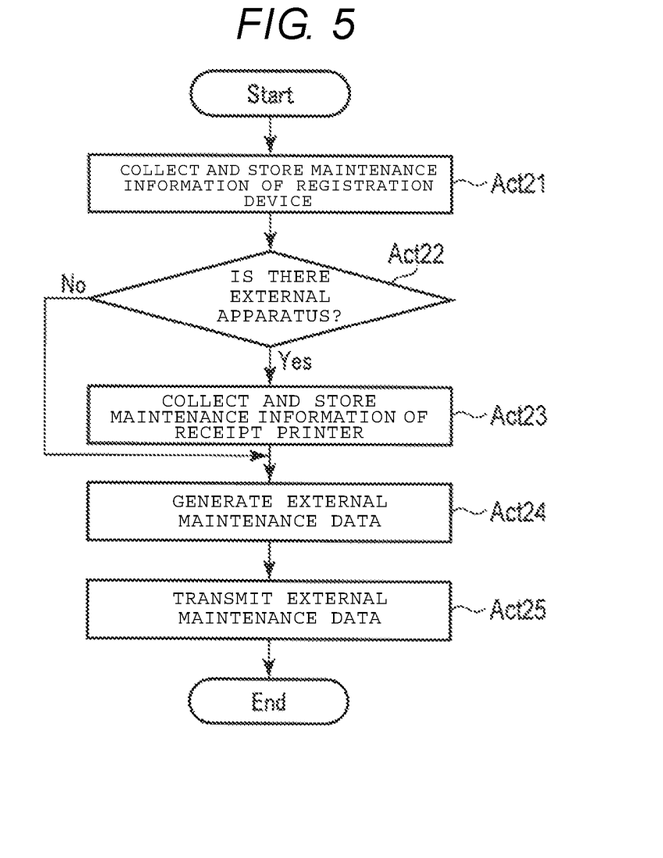
FIG. 5 is a flowchart of collection processing which is performed by a CPU.

FIG. 5 is a flowchart of a collection processing which can be performed by the CPU 11.

In Act 21, the CPU 11 collects maintenance information of the registration device 10, and stores the maintenance information in the RAM 13 or the auxiliary storage unit 14. Here, the maintenance information is data relating to maintenance of the registration device 10. Types of data which the CPU 11 collects as the maintenance information of the registration device 10 may be arbitrarily determined by, for example, a designer, a creator, or the like of the printer driver program 14a. For example, the maintenance information of the registration device 10 may include a version number of the operation system, a version number of the printer driver program 14a, a cumulative time for which the registration device 10 has been in operation, a property/condition of the auxiliary storage unit 14, or the like. Hence, as the CPU 11 performs the control processing based on the printer driver program 14a, the computer, which comprises CPU 11, functions as an acquisition unit which acquires the maintenance information of the registration device 10.

In Act 22, the CPU 11 determines whether or not there are any other external apparatuses. In the present embodiment, the customer display 30, the magnetic card reader 40, and the drawer 50 are external apparatuses. In this case, the CPU 11 determines that the answer is Yes and proceeds to Act 23.

In Act 23, the CPU 11 collects maintenance information of the external apparatuses and stores the maintenance information in the RAM 13 or the auxiliary storage unit 14. Here, maintenance information for the external apparatuses is data relating to maintenance of the external apparatuses. Types of data which the CPU 11 collects as the maintenance information of the external apparatuses may be arbitrarily determined by, for example, a designer, a creator, or the like of the printer driver program 14a. For example, the maintenance information of the external apparatuses may be cumulative time for which the customer display 30 has been performs display, a cumulative number of readings by the magnetic card reader 40, a cumulative number of releases of the drawer 50, any abnormality (error) occurrences for each apparatus, or the like.

If collection and storage of the maintenance information of the external apparatuses has been completed, the CPU 11 proceeds to Act 24. If there are no external apparatuses, the CPU 11 determines that the answer is No in Act 22 and bypasses Act 23 to proceed to Act 24.

In Act 24, the CPU 11 generates external maintenance data. Specifically, the CPU 11 includes the maintenance information of the registration device 10 (stored in Act 21) in the external maintenance data. In addition, if the maintenance information of the external apparatuses (stored in Act 23) exists, the CPU 11 also includes the maintenance information of the external apparatuses in the external maintenance data.

In Act 25, the CPU 11 instructs the printer interface 16 to transmit the external maintenance data generated as described above, and then ends the collection processing. The printer interface 16 transmits the external maintenance data to the receipt printer 20, according to the instruction. If the external maintenance data is transmitted to the receipt printer 20, the communication interface 27 receives the external maintenance data. Hence, the printer interface 16 is an example of a communication device which transmits the maintenance information of the registration device 10 to the receipt printer 20. As the CPU 11 performs the control processing based on the printer driver program 14a, the computer, which comprises the CPU 11, functions as a transmission control unit which controls the printer interface 16 to transmit the maintenance information of the registration device 10. Thereby, a function as a transmission unit which transmits the maintenance information of the registration device 10 to the receipt printer 20 is realized by cooperation of the computer having the CPU 11 as a central unit and the printer interface 16. In addition, the communication interface 27 is an example of a reception unit.

Thus, the CPU 21 of the receipt printer 20 ends Act 2 of FIG. 4, and thereafter, proceeds to Act 3.

In Act 3, the CPU 21 waits for reception of the external maintenance data. If the external maintenance data is received by the communication interface 27 as described above, the CPU 21 determines that the answer is Yes, and proceeds to Act 4.

In Act 4, the CPU 21 stores the external maintenance data received by the communication interface 27 in the RAM 23 or the auxiliary storage unit 24. After that, the CPU 21 proceeds to Act 5. If it is determined that the answer is No in Act 1 since the external collection flag is set to "0", the CPU 21 passes Act 2 to Act 4 to proceed to Act 5.

In Act 5, the CPU 21 collects maintenance information of the receipt printer 20 and stores the maintenance information in the RAM 23 or the auxiliary storage unit 24. Types of data which the CPU 21 collects as the maintenance information of the receipt printer 20 may be arbitrarily determined by, for example, a designer, a creator, or the like of the control program for the CPU 21. For example, the maintenance information of the receipt printer 20 may be a total print volume, a print volume generated by using attached print head, or the like.

In Act 6, the CPU 21 generates total maintenance data. Specifically, the CPU 21 includes the maintenance information of the receipt printer 20 stored in Act 5 in the total maintenance data. If the external maintenance data is stored in Act 4, the CPU 21 includes the external maintenance data in the external maintenance data.

In Act 7, the CPU 21 determines whether or not transmission is requested. If the transmission is not requested, the CPU 21 determines that the answer is No and proceeds to Act 8.

In Act 8, the CPU 21 determines whether or not print instruction is given. If the print instruction is not given by a predetermined button operation on the operation panel 25, the CPU 21 determines that the answer is No and proceeds to Act 9.

In Act 9, the CPU 21 determines whether or not the predetermined standby time is expired. If the predetermined standby time is not expired, the CPU 21 returns to Act 7.

Hence, in Act 7 to Act 9, the CPU 21 waits for whether the transmission is requested, the print instruction is given, or the predetermined standby time is expired.

If printing of a maintenance sheet is requested, a maintenance worker instructs printing by operating buttons on the operation panel 25 by using a predetermined method. Then, the CPU 21 determines that the answer is Yes in Act 8, and proceeds to Act 10.

If elapsed time in the standby mode of Act 7 to Act 9 reaches the predetermined standby time, the CPU 21 determines that the answer is Yes in Act 9. In this case, the CPU 21 also proceeds to Act 10.

In Act 10, the CPU 21 instructs the print unit 26 to print the maintenance sheet. Specifically, the CPU 21 instructs the print unit 26 to print an image representing the total maintenance data generated in Act 6. The print unit 26 prints the maintenance sheet by printing the image on a print medium, according to the instruction. That is, the maintenance sheet is obtained by printing the image representing the maintenance data on the print medium. The image may be an image of a character string or the like representing the maintenance data such that the maintenance worker can directly understand, or may be an image which is mechanically readable by using a QR code® or the like. Hence, as the CPU 21 performs the control processing based on the control program, the computer, which comprises the CPU 21, functions as a control unit which controls the print unit 26 to print the maintenance information of the registration device 10, the receipt printer 20, and the external apparatuses. If printing of the maintenance sheet ends, the CPU 21 ends the control processing illustrated in FIG. 4.

Meanwhile, if the maintenance worker wants to acquire maintenance information of the accounting system 100 from the information terminal 200, the information terminal 200 is moved in close proximity to the receipt printer 20, when the CPU 21 is in the standby mode of Act 7 to Act 9. Then, the information terminal 200 can perform the NFC communication with the NFC unit 28.

At this time, the maintenance worker keeps the information terminal 200 in the maintenance mode. Alternatively, as the NFC communication can be performed, the information terminal 200 may automatically start processing for maintenance by an operation of the operating system or the firmware. By the processing, the information terminal 200 requests the receipt printer 20 to transmit the external maintenance data through the NFC communication. The request is received by the NFC unit 28.

Since the receipt printer 29 is in the standby mode in Act 7 to Act 9, the CPU 21 in the receipt printer 20 determines that the answer is Yes in Act 7 and proceeds to Act 11, as the request is received by the NFC unit 28.

In Act 11, the CPU 21 wirelessly transmits the total maintenance data generated in Act 6 from the NFC unit 28. If the transmission is completed, the CPU 21 ends the control processing illustrated in FIG. 4. Hence, as the CPU 21 performs the control processing based on the control program, the computer, which comprises the CPU 21, and the NFC unit 28, enable wireless communication to transmit the total maintenance data to the information terminal 200.

As described above, the printer driver collects the maintenance information of the registration device 10, and transmits the maintenance information to the receipt printer 20, according to the request from the receipt printer 20 in the maintenance mode. The receipt printer 20 prints a maintenance sheet in which the maintenance information of the registration device 10 is represented together with the maintenance information of the receipt printer 20 on the receipt printer 20. Thereby, a maintenance worker can confirm both the maintenance information of the registration device 10 and the maintenance information of the receipt printer 20 on the maintenance sheet. At this time, the maintenance worker does not need to perform any operation with the registration device 10 other than setting an operation mode of the receipt printer 20 to the maintenance mode.

In addition, the printer driver further collects the maintenance information of the external apparatuses, and transmits this maintenance information to the receipt printer 20. The receipt printer 20 can print a maintenance sheet including the maintenance information of the external apparatuses together with the maintenance information of the registration device 10 and the receipt printer 20. Thereby, the maintenance worker can confirm the maintenance information of the registration device 10, the receipt printer 20, and the external apparatuses on the maintenance sheet. At this time, the maintenance worker cannot perform any operation with the external apparatus.

In addition, the receipt printer 20 transmits total maintenance data including the maintenance information of the registration device 10 and the maintenance information of the receipt printer 20, or the total maintenance data further including the maintenance information of the external apparatuses to the information terminal 200, instead of printing the maintenance sheet. Thereby, the maintenance worker can confirm the maintenance information of the registration device 10, the receipt printer 20, and the external apparatuses in the information terminal 200.

If the external collection flag is set to "0", the receipt printer 20 does not request the printer driver to collect the maintenance information. Thereby, if only the maintenance information of the receipt printer 20 may be collected, the maintenance worker can set the external collection flag to "0" only for the receipt printer 20.

The embodiment can be variously modified, for example, as follows.

A printer which prints a printed material other than a sheet can also perform the substantially the same operation as the receipt printer 20. An apparatus which performs processing other than the registration processing of a sales transaction can also perform substantially the same operation as the registration device 10.

In Act 10, the CPU 21 may instruct the print unit 26 to print a plurality of maintenance sheets. That is, the CPU 21 may instruct the print unit 26 to print, for example m, three maintenance sheets which separately represent the maintenance information of the registration device 10, the receipt printer 20, and the external apparatuses, respectively. Alternatively, the CPU 21 may instruct the print unit 26 to print, for example, a maintenance sheet which represents the maintenance information of two of the registration device 10, the receipt printer 20, and the external apparatuses and a maintenance sheet which represents the maintenance information of the other of the registration device 10, the receipt printer 20, and the external apparatuses. The CPU 21 may control the print unit 26 to print the maintenance information of one of the registration device 10, the receipt printer 20, and the external apparatuses on a plurality of print media.

It is also possible for the printer driver to be provided in a dedicated computer that is mounted in an apparatus along with another computer which controls other operations of the apparatus such as operations of the registration device 10.

In some embodiments, any other communication methods other than the NFC communication method, may be used for the communication between the receipt printer 20 and the information terminal 200.

In some embodiments, the NFC unit 28 or the antenna 28*a* may be externally attached to the receipt printer 20 without being embedded therein.

In some embodiments, the CPU 21 may perform Act 10 and Act 11 simultaneously, and may provide instructions to print the maintenance sheet and transmit the total maintenance data.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A printing apparatus, comprising:
   a printer including a first processor, a printing unit that is capable of printing on a print medium, and an operation panel; and
   a registration device connected to the printer and including a second processor and storing a printer driver, wherein
   the printer stores a control program that when executed by the first processor causes:
   the printer to request first maintenance information of the registration device from the printer driver,
   the printer to acquire second maintenance information of the printer, and
   the printer to output at least one of the first and second maintenance information, and
   the operation panel includes a button that when pressed for a predetermined time period while the printer is in a standby mode causes the printer to enter a maintenance mode during which the control program is executed by the first processor.

2. The printing apparatus according to claim 1, wherein, when executed, the control program causes the printer to store the first maintenance information in a storage medium.

3. The printing apparatus according to claim 1, wherein the printing unit is one of a thermal printing unit, an inkjet printing unit, or a dot impact printing unit.

4. The printing apparatus according to claim 1, wherein the registration device is a point-of-sale terminal.

5. The printing apparatus of according to claim 1, further comprising:
   an external apparatus connected to the registration device, wherein
   the printer driver is configured to acquire third maintenance information of the external apparatus and transmit the third maintenance information to the printer.

6. The printing apparatus according to claim 5, wherein the external apparatus is one of a customer display, a magnetic card reader, or a cash register drawer.

7. The printing apparatus according to claim 5, wherein the control program, when executed by the first processor, further causes the printer to output the third maintenance information.

8. The printing apparatus of according to claim 1, wherein the output of at least one of the first and second maintenance information is by printing at least one of the first and second maintenance information on the print medium.

9. The printing apparatus according to claim 1, further comprising:
   a wireless communication unit configured to wirelessly transmit data including at least one of the first and second maintenance information to an external information terminal, wherein
   the output of at least one of the first and second maintenance information is by transmission of data including at least one of the first and second maintenance information to the external information terminal.

10. The printing apparatus according to claim 9, wherein the wireless communication unit is a near field communication interface unit.

11. The printing apparatus according to claim 10, wherein the near field communication unit is incorporated within the printer.

12. A printer driver stored in a registration device connected to a printer, the printer driver being configured to:
    control the printer to print information on a print medium;
    acquire first maintenance information of the registration device upon a request being received from the printer; and
    transmit first maintenance information from the registration device to the printer after the first maintenance information has been acquired.

13. The printer driver according to claim 12, wherein the first maintenance information includes at least one of a version number of the printer driver, a version number of an operating system running on the registration device, or a cumulative operation time of the registration device.

14. The printer driver according to claim 13, further configured to:
    acquire second maintenance information of an external apparatus connected to the registration device upon the request being received from the printer; and
    transmit the second maintenance information from the registration device to the printer.

15. The printer driver according to claim 12, wherein the registration device is a point-of-sale terminal.

16. A non-transitory computer readable medium storing program instructions for a printer driver that when executed by a processor in a registration device connected to a printer causes the registration device to:
    control the printer to print information on a print medium;
    acquire first maintenance information of the registration device upon a request being received from the printer, the first maintenance information including at least one of a version number of the printer driver, a version number of an operating system running on the registration device, or a cumulative operation time of the registration device; and
    transmit the first maintenance information from the registration device to the printer after the first maintenance information has been acquired.

17. The non-transitory computer readable medium according to claim 16, wherein the printer driver further causes the registration device to:
    acquire second maintenance information of an external apparatus connected to the registration device upon the request being received from the printer; and
    transmit the second maintenance information from the registration device to the printer.

18. The non-transitory computer readable medium according to claim 16, wherein the registration device is a point-of-sale terminal.

* * * * *